United States Patent
Bradshaw et al.

(10) Patent No.: US 10,795,810 B2
(45) Date of Patent: Oct. 6, 2020

(54) WEAR-LEVELING SCHEME FOR MEMORY SUBSYSTEMS

(71) Applicant: Micron Technology, Inc., Boise, ID (US)

(72) Inventors: Samuel E. Bradshaw, Sacramento, CA (US); Justin Eno, El Dorado Hills, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

(21) Appl. No.: 16/127,025

(22) Filed: Sep. 10, 2018

(65) Prior Publication Data

US 2020/0081829 A1 Mar. 12, 2020

(51) Int. Cl.
*G06F 12/02* (2006.01)
*G06F 12/1009* (2016.01)
*G06F 3/06* (2006.01)

(52) U.S. Cl.
CPC ........ *G06F 12/0246* (2013.01); *G06F 3/0616* (2013.01); *G06F 3/0647* (2013.01); *G06F 3/0679* (2013.01); *G06F 12/1009* (2013.01); *G06F 2212/7201* (2013.01); *G06F 2212/7211* (2013.01)

(58) Field of Classification Search
CPC .................................................. G06F 12/0246
See application file for complete search history.

(56) References Cited

U.S. PATENT DOCUMENTS

| | | | |
|---|---|---|---|
| 2008/0082728 A1* | 4/2008 | Traister | G06F 12/0246 711/103 |
| 2010/0235605 A1* | 9/2010 | Perry | G06F 12/0246 711/170 |
| 2016/0299724 A1* | 10/2016 | Vanaraj | G06F 11/1076 |
| 2018/0129602 A1* | 5/2018 | Hsu | G06F 3/0608 |
| 2018/0157427 A1* | 6/2018 | Hong | G06F 3/0616 |

OTHER PUBLICATIONS

Qureshi, et al., "Enhancing Lifetime and Security of PCM-Based Main Memory with Start-Gap Wear Leveling," Proceedings of the 42nd Annual IEEE/ACM International Symposium on Microarchitecture (MICRO'09), Dec. 2-16, 2009, 10 pages.

* cited by examiner

*Primary Examiner* — Edward J Dudek, Jr.
(74) *Attorney, Agent, or Firm* — Nicholson De Vos Webster & Elliott LLP

(57) ABSTRACT

A wear-leveling process for a memory subsystem selects a source chunk to be removed from a usable address space of the memory subsystem to distribute wear across all available chunks in the memory subsystem. The memory subsystem has a plurality of non-volatile memory components. The plurality of non-volatile memory components includes a plurality of chunks including at least one chunk in an unusable address space of the memory subsystem. The wear-leveling process copies valid data of the source chunk to a destination chunk in the unusable address space of the memory subsystem and assigns the destination chunk to a location in the usable address space of the memory subsystem occupied by the source chunk.

20 Claims, 12 Drawing Sheets

| LOGICAL DIE ADDRESS | CHANNEL | PHYSICAL DIE ADDRESS |
|---|---|---|
| 0 | 0 | 0 |
| 1 | 1 | 0 |
| 2 | 2 | 0 |
| 3 | 3 | 0 |
| 4 | 4 | 0 |
| 5 | 15 | 3 |
| 6 | 6 | 0 |
| 7 | 7 | 0 |
| 8 | 8 | 0 |
| 9 | 9 | 0 |
| 10 | 10 | 0 |
| 11 | 11 | 0 |
| ... | ... | ... |
| 55 | 7 | 3 |
| 56 | 8 | 3 |
| 57 | 9 | 3 |
| 58 | 10 | 3 |
| 59 | 11 | 3 |
| 60 | 12 | 3 |
| 61 | 13 | 3 |
| 62 | 14 | 3 |
| UNUSED | 5 | 0 |

REMAPPED STATE – DESIRED VIRTUALIZATION TABLE

| LOGICAL DIE ADDRESS | CHANNEL | PHYSICAL DIE ADDRESS |
|---|---|---|
| 0 | 0 | 0 |
| 1 | 1 | 0 |
| 2 | 2 | 0 |
| 3 | 3 | 0 |
| 4 | 4 | 0 |
| 5 | 5 | 0 |
| 6 | 6 | 0 |
| 7 | 7 | 0 |
| 8 | 8 | 0 |
| 9 | 9 | 0 |
| 10 | 10 | 0 |
| 11 | 11 | 0 |
| ... | ... | ... |
| 55 | 7 | 3 |
| 56 | 8 | 3 |
| 57 | 9 | 3 |
| 58 | 10 | 3 |
| 59 | 11 | 3 |
| 60 | 12 | 3 |
| 61 | 13 | 3 |
| 62 | 14 | 3 |
| UNUSED | 15 | 3 |

INITIAL STATE – CURRENT VIRTUALIZATION TABLE

FIG. 3

| LOGICAL DIE ADDRESS | CHANNEL | CHANNEL DIE ADDRESS |
|---|---|---|
| 0 | 0 | 0 |
| 1 | 2 | 0 |
| 2 | 3 | 0 |
| 3 | 4 | 0 |
| 4 | 5 | 0 |
| 5 | 6 | 0 |
| 6 | 7 | 0 |
| 7 | 8 | 0 |
| 8 | 9 | 0 |
| 9 | 10 | 0 |
| 10 | 11 | 0 |
| 11 | 12 | 0 |
| ... | ... | ... |
| 45 | 13 | 2 |
| 46 | 14 | 2 |
| 47 | 15 | 2 |
| 48 | 0 | 3 |
| 49 | 1 | 3 |
| 50 | 2 | 3 |
| 51 | 3 | 3 |
| 52 | 4 | 3 |
| 53 | 5 | 3 |
| 54 | 6 | 3 |
| 55 | 7 | 3 |
| 56 | 8 | 3 |
| 57 | 9 | 3 |
| 58 | 10 | 3 |
| 59 | 11 | 3 |
| 60 | 13 | 3 |
| 61 | 14 | 3 |
| 62 | 15 | 3 |
| UNMAPPED | 1 | 0 |

STATE 0

← XCHG PTR (at row 0)

| LOGICAL DIE ADDRESS | CHANNEL | CHANNEL DIE ADDRESS |
|---|---|---|
| 0 | 1 | 0 |
| 1 | 2 | 0 |
| 2 | 3 | 0 |
| 3 | 4 | 0 |
| 4 | 5 | 0 |
| 5 | 6 | 0 |
| 6 | 7 | 0 |
| 7 | 8 | 0 |
| 8 | 9 | 0 |
| 9 | 10 | 0 |
| 10 | 11 | 0 |
| 11 | 12 | 0 |
| ... | ... | ... |
| 45 | 13 | 2 |
| 46 | 14 | 2 |
| 47 | 15 | 2 |
| 48 | 0 | 3 |
| 49 | 1 | 3 |
| 50 | 2 | 3 |
| 51 | 3 | 3 |
| 52 | 4 | 3 |
| 53 | 5 | 3 |
| 54 | 6 | 3 |
| 55 | 7 | 3 |
| 56 | 8 | 3 |
| 57 | 9 | 3 |
| 58 | 10 | 3 |
| 59 | 11 | 3 |
| 60 | 13 | 3 |
| 61 | 14 | 3 |
| 62 | 15 | 3 |
| UNMAPPED | 0 | 0 |

STATE 1

← XCHG PTR (at UNMAPPED)

FIG. 4

| LOGICAL DIE ADDRESS | CHANNEL | CHANNEL DIE ADDRESS |
|---|---|---|
| 0 | 1 | 0 |
| 1 | 2 | 0 |
| 2 | 3 | 0 |
| 3 | 4 | 0 |
| 4 | 5 | 0 |
| 5 | 6 | 0 |
| 6 | 7 | 0 |
| 7 | 8 | 0 |
| 8 | 9 | 0 |
| 9 | 10 | 0 |
| 10 | 11 | 0 |
| 11 | 12 | 0 |
| ... | ... | ... |
| 45 | 13 | 2 |
| 46 | 14 | 2 |
| 47 | 15 | 2 |
| 48 | 0 | 3 |
| 49 | 1 | 3 |
| 50 | 2 | 3 |
| 51 | 3 | 3 |
| 52 | 4 | 3 |
| 53 | 5 | 3 |
| 54 | 6 | 3 |
| 55 | 7 | 3 |
| 56 | 8 | 3 |
| 57 | 9 | 3 |
| 58 | 10 | 3 |
| 59 | 11 | 3 |
| 60 | 13 | 3 |
| 61 | 14 | 3 | ← XCHG PTR
| 62 | 0 | 0 |
| UNMAPPED | 15 | 3 |

STATE 2

| LOGICAL DIE ADDRESS | CHANNEL | CHANNEL DIE ADDRESS |
|---|---|---|
| 0 | 1 | 0 |
| 1 | 2 | 0 |
| 2 | 3 | 0 |
| 3 | 4 | 0 |
| 4 | 5 | 0 |
| 5 | 6 | 0 |
| 6 | 7 | 0 |
| 7 | 8 | 0 |
| 8 | 9 | 0 |
| 9 | 10 | 0 |
| 10 | 11 | 0 |
| 11 | 12 | 0 |
| ... | ... | ... |
| 45 | 13 | 2 |
| 46 | 14 | 2 |
| 47 | 15 | 2 |
| 48 | 0 | 3 |
| 49 | 1 | 3 |
| 50 | 2 | 3 |
| 51 | 3 | 3 |
| 52 | 4 | 3 |
| 53 | 5 | 3 |
| 54 | 6 | 3 |
| 55 | 7 | 3 |
| 56 | 8 | 3 |
| 57 | 9 | 3 |
| 58 | 10 | 3 |
| 59 | 11 | 3 |
| 60 | 13 | 3 | ← XCHG PTR
| 61 | 15 | 3 |
| 62 | 0 | 0 |
| UNMAPPED | 14 | 3 |

STATE 3

WEAR-LEVELING SCHEME FOR MEMORY SUBSYSTEMS

TECHNICAL FIELD

The present disclosure generally relates to memory subsystem management, and more specifically, relates to a wear-leveling scheme for memory subsystems.

BACKGROUND ART

A memory subsystem can be a storage system, such as a solid-state drive (SSD), and can include one or more memory components that store data. The memory components can be, for example, non-volatile memory components and volatile memory components. In general, a host system can utilize a memory subsystem to store data at the memory components and to retrieve data from the memory components.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 3 is a diagram of an example of logical to physical die mapping.

FIG. 4 is a diagram of another example of logical to physical die mapping.

FIG. 6 is a diagram of an example block based wear-leveling process.

FIG. 7 is a diagram of an example block based wear-leveling process.

FIG. 8 is a diagram of an example block based wear-leveling process.

FIG. 9 is a diagram of an example block based wear-leveling process.

DETAILED DESCRIPTION

Figure 1:
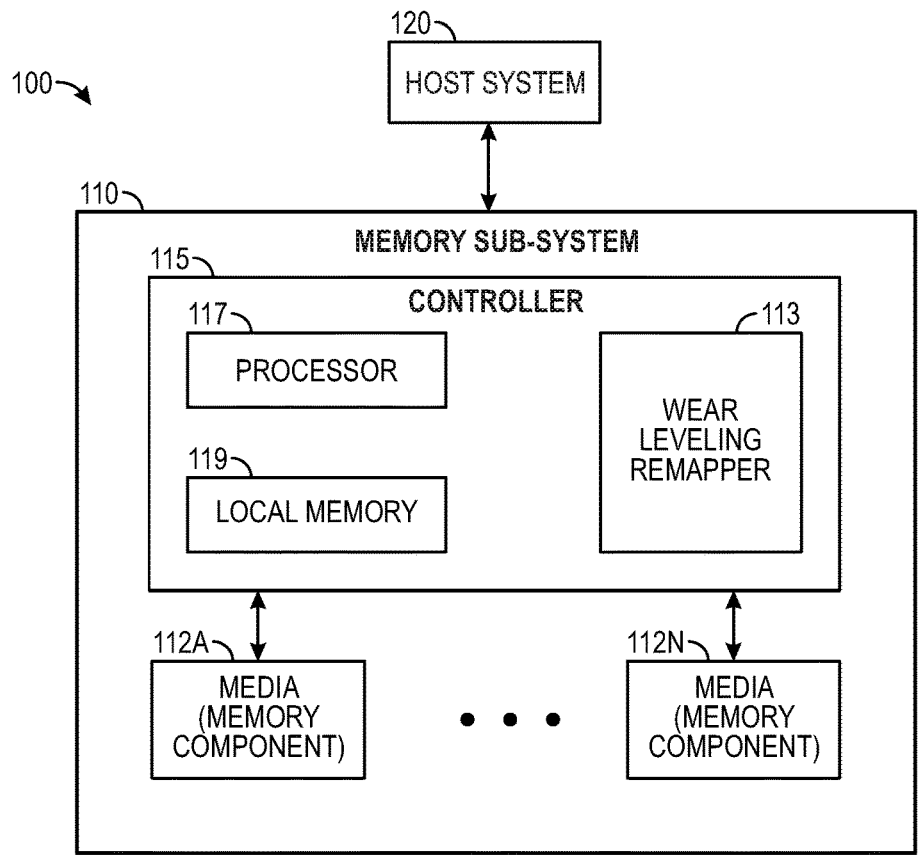
FIG. 1 illustrates an example computing environment that includes a memory subsystem.

Aspects of the present disclosure are directed to wear-leveling in a memory subsystem. A memory subsystem is also hereinafter referred to as a "memory device." An example of a memory subsystem is a memory module that is connected to a central processing unit (CPU) via a memory bus. Examples of memory modules include a dual in-line memory module (DIMM), a small outline DIMM (SO-DIMM), a non-volatile dual in-line memory module (NVDIMM), etc. Another example of a memory subsystem is a storage device that is connected to the central processing unit (CPU) via a peripheral interconnect (e.g., an input/output bus, a storage area network, etc.). Examples of storage devices include a solid-state drive (SSD), a flash drive, a universal serial bus (USB) flash drive, and a hard disk drive (HDD). In some embodiments, the memory subsystem is a hybrid memory/storage subsystem. In general, a host system can utilize a memory subsystem that includes one or more memory components. The host system can provide data to be stored at the memory subsystem and can request data to be retrieved from the memory subsystem.

In the embodiments, a storage device including a memory-subsystem implements a process for wear-leveling in the memory subsystem. The memory subsystem includes a set of non-volatile memory components. A 'set,' as used herein, refers to any positive whole number of items, including one item. The set of non-volatile memory components define a set of chunks that are sub-divisions of the memory components. The set of chunks include at least one chunk in an unusable address space of the memory subsystem. Thus, the chunk in the unusable address space cannot be read from or written to by a host system. The memory subsystem can include a controller. The controller can include a processor communicatively attached to the set of non-volatile memory components.

The processor includes a wear-leveling remapper component that implements the wear-leveling scheme. The wear-leveling remapper migrates valid data from a chunk in a usable address space of the memory subsystem to another chunk in the unusable address space of the memory subsystem. Migrating this data enables an improved wear-leveling of the non-volatile memory components. In addition, the wear-leveling remapper maintains and updates mapping information to enable indirect addressing of the data in chunks in the usable address space of the memory subsystem. The wear-leveling remapper migrates data to chunks in unusable address space and then remaps these chunks to be in the usable address space of the memory subsystem. In this manner, the wear-leveling remapper implements a scheme that distributes wear over all chunks including those chunks that may have not been utilized because they were outside the address space of the memory subsystem. Increasing the number of participating chunks improves wear-leveling by spreading wear over a greater number of chunks thereby enabling all chunks to have a longer operational life.

Thus, aspects of the present disclosure address the deficiencies of the art where chunks in unused address space do not participate in wear-leveling processes and cause the chunks in the accessible address space to have a shorter operational life.

FIG. 1 illustrates an example computing environment 100 that includes a memory subsystem 110 in accordance with some embodiments of the present disclosure. The memory subsystem 110 can include media, such as memory components 112A to 112N. The memory components 112A to 112N can be volatile memory components, non-volatile memory components, or a combination of such. In some embodiments, the memory subsystem is a storage system. An example of a storage system is an SSD. In some embodiments, the memory subsystem 110 is a hybrid memory/storage subsystem. In general, the computing environment 100 can include a host system 120 that uses the memory subsystem 110. For example, the host system 120 can write data to the memory subsystem 110 and read data from the memory subsystem 110.

The host system 120 can be a computing device such as a desktop computer, laptop computer, network server, mobile device, or such computing device that includes a memory and a processing device. The host system 120 can include or be coupled to the memory subsystem 110 so that the host system 120 can read data from or write data to the memory subsystem 110. The host system 120 can be coupled to the memory subsystem 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory subsystem 110. The host system 120 can further utilize an NVM Express (NVMe) interface to access the memory components 112A to 112N when the memory subsystem 110 is coupled with the host system 120 by the PCIe interface. The physical host interface can provide an interface for passing control, address, data, and other signals between the memory subsystem 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, and an electrically erasable programmable read-only memory (EEPROM). The PCM can be a two-dimensional or three-dimensional array of non-volatile memory cells. An array of non-volatile memory can perform bit storage based on a change of bulk resistance, in conjunction with a stackable cross-gridded data access array. Additionally, in contrast to many flash-based memories, array based PCM non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

In one embodiment, PCM technology that changes the bulk resistance of the material constructs an array of non-volatile storage elements of memory components 1124A to 112N, including an array that is three-dimensional (3D). In one embodiment, chalcogenide glass provides the material to construct the storage elements, as well as the corresponding selectors. The plurality of dice forming the memory components 112A to 112N may be arranged in various ways.

In one embodiment, the dice 1 through n (where "n" is an integer) of memory components 112A to 112N may represent the dice of the various described embodiments of this disclosure. The memory subsystem controller 115 couples to memory components 112A to 112N via access lines, such as bitlines, wordlines, control lines, to access the memory components 112A to 112N to perform various operations, such as read, write, erase, etc.

The number of dice forming memory components 112A to 112N varies depending on how much memory is desirable or designed for a system. In an example, 128 dice could provide 2 terabytes of storage, while 256 dice provide 4 terabytes.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory subsystem 110, including handling communications between the memory subsystem 110 and the host system 120. In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the controller 115, in another embodiment of the present disclosure, a memory subsystem 110 may not include a controller 115, and may instead rely upon external control (e.g., provided by an external host, or by a processor or controller separate from the memory subsystem).

In general, the controller 115 can receive commands or operations from the host system 120 and can convert the commands or operations into instructions or appropriate commands to achieve the desired access to the memory components 112A to 112N. The controller 115 can be responsible for other operations such as wear-leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the controller 115 and decode the address to access the memory components 112A to 112N.

The memory subsystem 110 includes wear-leveling remapper component 113 that can increase the operational life of the memory components 112A to 112N. In some embodiments, the controller 115 includes at least a portion of the wear-leveling remapper component 113. For example, the controller 115 can include a processor 117 (processing device) configured to execute instructions stored in local memory 119 for performing the operations described herein. In some embodiments, the wear-leveling remapper component 113 is part of the host system 120, an application, or an operating system.

The wear-leveling remapper component 113 can implement a wear-leveling process to manipulate the address space to cover all chunks in the memory components 112A to 112N in a case where the size of the address space does not align with the size of the storage in the memory components 112A to 112N. Further details with regards to the operations of the wear-leveling remapper component 113 are described below. The technique(s) of remapping may be applied to a variety of non-volatile memory devices (e.g. NAND memory devices). In some instances, memory devices can be referred to as media.

PCM based media and similar technologies can withstand a fixed number of write cycles before the bit error rates begin to be practically unmanageable. A wear-leveling scheme can be employed to maintain a static storage capacity throughout the rated lifetime of any memory component based on this technology. The number of cycles before "failure" of these PCM based memory components is high compared to NAND based memory components. The embodiments provide a wear-leveling process that is suitable for PCM based media and similar technology.

The embodiments provide a wear-leveling process that utilizes a remapping of units of memory components. These units can be 'chunks,' which, as used herein, refers to units that are of any size or granularity. In some cases, the wear-leveling process can use chunks that are block sized. 'Blocks,' as used herein, refer to chunks that are arbitrary multiples of a managed unit size down to a single managed unit. A 'managed unit,' as used herein, refers to a unit that is a minimum atomic write granularity for a memory subsystem.

Figure 2:
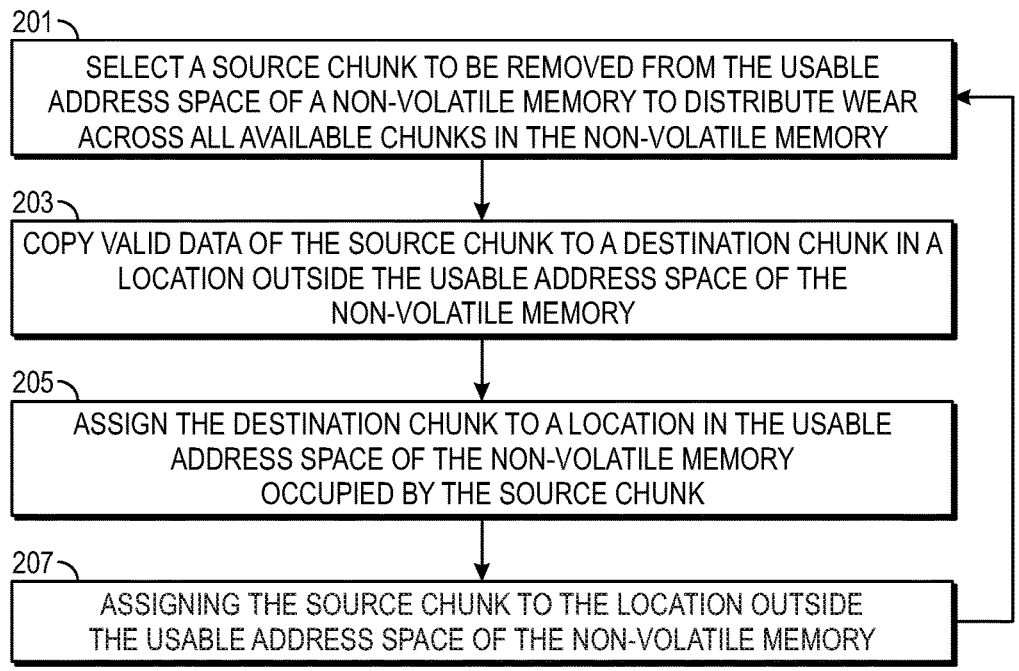
FIG. 2 is a flowchart of one embodiment of a process for wear-leveling in a memory subsystem

FIG. 2 is a flow diagram of the wear-leveling process applicable to any level of granularity. The process can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

The wear-leveling process is described as being performed by wear-leveling remapper 113 and in relation to a chunk granularity, which as set forth above can be of any size or granularity. The wear-leveling process makes use of spare chunks that are not within a usable address space of the memory components 112A to 112N. Thus, a host system 120 cannot access these chunks as they are in a physical address space that is unknown or not 'visible' to the host system 120. The wear-leveling remapper rotates the spare chunks into the usable or 'visible' address space using address translation indirection and data migration to spread wear across all of the chunks in the memory subsystem 110.

The wear-leveling process can be triggered by a need to service a write request from a host system 120 or similar event. The wear-leveling process selects a source chunk to be removed from the usable address space of the memory components 112A to 112N (Block 201). The wear-leveling remapper 113 can implement any algorithm or metric to select a chunk to be removed from the usable address space of the memory components 112A to 112N. For example, a source chunk with a high write count can be selected to reduce wear on that chunk.

The wear-leveling remapper 113 copies valid data in the selected source chunk to a destination chunk (Block 203). The destination chunk is a chunk that is not in the usable address space of the memory subsystem 110. If there is more than one possible destination chunk, the wear-leveling remapper 113 can select one chunk from the set of chunks in the unusable address space of the memory subsystem 110. The wear-leveling remapper 113 can use any selection mechanism to determine a destination chunk. For example, the destination chunk with a lowest write count can be selected.

The wear-leveling remapper 113 assigns the destination chunk to a location in the usable logical address space of the memory subsystem 110 (Block 205). The destination selected by the wear-leveling remapper 113 can be the location that is currently held by the source chunk. In this manner, the wear-leveling remapper 113 swaps the source chunk with the destination chunk in the logical address space of the memory subsystem 110. The wear-leveling remapper 113 can update a virtualization table or similar mechanism for creating and maintaining a virtualized representation of the memory subsystem 110. Specific example embodiments of this virtualized representation are described herein below. Similarly, the wear-leveling remapper 113 can assign the source chunk to a location outside the usable address space of the memory subsystem 110 (Block 207) to complete the wear-leveling process. The wear-leveling remapper 113 updates the virtualization table or similar mechanism to remove the logical addressing of the source chunk and thereby place it outside the usable address space of the memory subsystem 110.

The embodiments include a variant that is provided by way of example and not limitation. One skilled in the art would understand that similar implementations and variation thereon are possible based on the principles and structures described with relation to the presented examples. In one embodiment, the block granularity is defined to be a die in the memory components 112A to 112N. The die offers storage for a fixed number of managed units. The die also has the property of having a unique positional address, or rank, on a channel. The embodiments are flexible enough to be deployed in a variety of permutations and granularities, all implementing the principles and structure of wear-leveling using a remapping capability.

In this example embodiment, a set of memory components 112A to 112N include spare dice. Spare dice are dice that do not have logical addresses within the logical address space of the memory subsystem 110 utilized by the host system 120. The wear-leveling remapper component 113 can dynamically rotate spare dice through the visible or usable address space, distributing wear among all dice in the memory subsystem 110. The visible or usable address space is the address space visible or accessible to the host system 120. The wear-leveling process of the embodiments can be deployed as the sole mechanism for wear management if the memory subsystem 110 can tolerate some degree of intra-die wear variation or in combination with one or more additional schemes that distribute wear intra-die. The wear-leveling process of the embodiments is amenable to concurrent user accesses and is power loss safe, provided that a small amount of data can be made persistent in a power loss event. The wear-leveling process re-populates state when power is re-applied and continues the wear-leveling process with the restored state.

The wear-leveling process is affected by address translation in the memory subsystem 110. The wear-leveling process is based on a static address translation flow leveraging the in-place update (i.e., an overwrite) capability of the memory components 112A to 112N (e.g., PCM based memory components). In one embodiment, a host system 120 usable logical address is mapped to a particular set of physical pages. In other embodiments, other logical address to physical address schemes can be utilized. The usable logical address to physical page model for die remapping is provided by way of illustration and not limitations.

If a fixed, algorithmic logical to physical address relationship were utilized, then there would be no opportunity to introduce indirection in the address translation flow. The embodiments of the die granularity wear-leveling process define a table-driven virtualization process. The table-driven virtualization process is introduced into the address translation flow of the controller 115 to support die virtualization. 'Die virtualization,' as used herein, refers to an overlay of logical dice that can be dynamically mapped to a set of physical dice in the memory subsystem 110. The wear-leveling remapper 113 manages the virtualization table. The virtualization table is indexed by logical die and has one entry per physical die in the topology of dies in the memory components 112A to 112N.

FIG. 3 is a diagram of an example virtualization table representation for die virtualization as part of a die granularity wear-leveling process. The virtualization table does not need to store the logical die address. The logical die address can be implied by the offset of any particular entry in the virtualization table. The example illustrated virtualization table is abbreviated, as shown by the gap between logical die 11 and 55 for conciseness. The virtualization table represents a die topology that is comprised of 64 dice across 16 physical channels (i.e., identified as channels 0 to 15), of which a single die is a spare die. Initially, the spare die is located at physical channel 15, offset 3, which is shown at the bottom of the table. The left-hand virtualization table shows an initial starting mapping. The righthand virtualization table shows a remap of the spare die into the logical address space corresponding to logical die 5. The wear-leveling remapper 113 remaps the die at channel 5 offset 0 to no longer have a logical address. Thus, the die at channel 5 offset 0 is no longer in the usable address space and is considered the spare die.

In this example, the virtualization table manipulation to remap a die swaps the entries in the illustrated virtualization table for die virtualization. If the source die of the swap hosts valid user data, the wear-leveling remapper 113 performs a data migration. The wear-leveling remapper 113 re-encodes (mirrors) the data that was located on the selected die into the spare die. The data migration process can be robust to concurrent user accesses. Taking the selected die offline for data migration is undesirable due to decreased data throughput and increased latency caused by the die being offline.

In one embodiment, the wear-leveling remapper 113 implements data migration as a phase driven migration. The phase driven migration utilizes a phase table that has a phase bit for every chunk, managed unit, or similar independently writeable unit representing the entire physical address space of the memory subsystem 110. In one embodiment, the virtualization table, for example as shown in FIG. 3, is replicated two times. One virtualization table copy contains a current (e.g., pre-migration) table configuration. The other virtualization table copy contains the desired (e.g., post-migration) table configuration. The phase bits for each writeable unit in the virtualization table are then set to a particular value corresponding to the current table configuration (e.g., all of the writeable units have a phase bit set to 0 indicating the writeable unit is consistent with the current virtualization table).

The process of migrating the configurations from a current virtualization table state to a desired virtualization table state then can be implemented as a pass over the phase table and the two virtualization tables. The wear-leveling remapper 113 or another background data management agent can manage the phase driven migration process. The phase driven migration process reads each writeable unit when the phase bit setting points to the current virtualization table, toggles the phase bit, and writes the same data pattern via the desired virtualization table, which is referenced by the phase bit after it is toggled. This read-toggle-rewrite sequence is atomic with respect to concurrent user accesses.

The phase driven migration process iterates over the entire address space of the memory sub-system 110 in writeable units. The phase driven migration process continues until all valid data in a source unit has been migrated to a destination unit according to the desired virtualization table phase bits. After the phase driven migration process is completed the current virtualization table is replaced by the desired virtualization table, which becomes the new current virtualization table. The phase driven migration process is robust for continued user access to the affected units of the memory subsystem 110 provided the operation is atomic. User accesses can follow the phase bit just as the wear-leveling remapper 113 or data management agent does. Host system 120 accesses to writeable units that aren't affected by the phase driven migration can read from the memory subsystem 110 using the current virtualization table. The host system 120 writes to the writeable units in memory sub-system 110 that aren't affected by the phase driven migration writeable using the desired virtualization table 1. For writeable units that are affected by the phase driven migration process, the host system 120 reads from the current or desired virtualization table indicated by a corresponding phase bit and writes to the location indicated in the desired virtualization table.

In some embodiments, the wear-leveling process includes a power loss safety mechanism. The wear-leveling remapper 113 or similar data management agent performs data migration that is power loss safe. The power loss persistence mechanism can consist of tracking the position of the wear-leveling remapper 113 in the phase table during a data migration. The position of the wear-leveling remapper 113 can be referred to as the cursor. In addition to the position information, the wear-leveling remapper 113 can also persist semantic information describing whether the phase bit transition was 0→1 or 1→0 in addition to the phase table position designation to make the phase bit value (0 or 1) meaningful. The wear-leveling remapper 113 maintains copies of the two virtualization tables as well, however, these can be persisted at the time they are derived, and before the data migration commences rather than at power loss, which reduces the hold-up time requirements.

The described data migration model assumes a one-way data transition where there may be valid data in the source chunk and the destination chunk does not store valid data (e.g., it's a spare chunk). If data exists in a destination chunk that needs to be converted to a spare state, before receiving the data from the source chunk, then the valid data of a destination chunk must be migrated using the same sequence as described herein above.

The wear-leveling process is implemented by deterministically, and algorithmically modifying the virtualization tables. The wear-leveling process then performs the data migration and commits the changes to the virtualization tables. The wear-leveling process can be continuous and repeating. Each virtualization table state represents a unique relationship between logical and physical chunks, though not every logical address will be assigned a different physical address on every table transition. The result of the wear-leveling process over the iterations of the process is that all logical addresses will be reassigned to different physical addresses. With continued iteration, the wear-leveling process will give each chunk the same exposure to accesses at a particular logical address (or set of logical addresses if the address translation stripes adjacent logical addresses across a set of chunks). As a result, the wear-leveling process achieves the intended distribution of the wear incurred by the accesses to the memory subsystem 110 over a longer duration of time.

In one embodiment, the wear-leveling process deterministically rotates chunks through the logical address space using a pointer. In one example implementation, a variable called the "exchange pointer" (XchgPtr) is defined. The exchange pointer identifies the offset in the usable address space portion of the virtualization table of a last source chunk. The wear-leveling process can initialize an exchange pointer to identify a specific entry (e.g., a highest logical address) in the virtualization table. With each data migration, the wear-leveling remapper 113 generates the conditions of the desired virtualization table by exchanging the source chunk identified by the exchange pointer in the current virtualization table with a destination chunk from a set of destination chunks that is not in the usable address space. After a data migration, the wear-leveling remapper 113 updates the exchange pointer to the next source chunk location. In an embodiment where the source chunk is determined based on a round robin or similar process, then wear-leveling remapper 113 can decrement or increment the exchange pointer by one (e.g., modulus the number of entries in the table plus or minus 1) and then the data migration commences.

FIG. 4 is a diagram of one embodiment of a sequence of updates to a virtualization table. This figure shows the first four virtualization table transition states (States 0-3). As shown, in just four state changes, the wear-leveling process rotates four different chunks through the unusable spare chunk and re-assigns chunks back into the user usable portion of the address space of the memory subsystem 110 at a different logical address location. The wear-leveling process moves the exchange pointer through the logical address space from a high entry to a lower entry after each data migration. The wear-leveling process places a different chunk in the unusable address space as a spare chunk, which is represented as the last entry in the virtualization table. In the example variant, with a 64 dice topology, as represented by a 64-entry virtualization table, it would take 63 iterations for every die to have spent one iteration as the unusable spare and be in a different logical address location relative to a starting position in the virtualization table.

In the embodiments using an exchange pointer to track a next source chunk location, the exchange pointer points to entries for chunks in the usable address space. In the example of FIG. 4, there are only 63 entries for chunks in usable address space, numbered 0-62. Thus, when the exchange pointer wraps around after a swap at entry 0, it must wrap to entry 62, such that it never points to the unusable address space location at logical entry 63. Thus, the wrap is modulus (N−M) where N is the total number of entries in the virtualization table (which corresponds to all physical dice in the topology of this example), inclusive of the unmapped entry. M is the number of unusable dice in this topology, here in this example M=1.

In the example illustrated, the exchange pointer wraps after State 0 from entry 0 to entry 62. The exchange pointer never points to the offset in the virtualization table for the unusable address space (i.e., entry 63). In the example, the exchange pointer value is bounded by 0 . . . N−1 where N is the total number of table entries, inclusive of any unmapped portions.

In order for the wear-leveling process to be effective, policies are defined to trigger data migrations such that the goal of wear-leveling can be realized. These policies can be based on a variety of internal and external triggers. If the objective of the wear-leveling is to wear-level write operations over the available chunks, then the wear-leveling process can include a policy to trigger based on a threshold count of the number of writes to any or all chunks in the memory subsystem 110—(e.g., any of the dice in the example topology). For PCM media, which experiences endurance degradation with both reads and writes, asymmetrically, the wear-leveling process can include a trigger that is a function of joint reads and writes to any or all chunks (e.g., any or all dice in the topology). In one embodiment, the function of joint reads and writes includes a transform function that is applied before comparing a result against a threshold that weights the read and write counts differently, thereby reflecting the asymmetrical nature of the degradation imposed by reads and writes on the memory components 112A to 112N of the memory subsystem 110.

In other embodiments, the wear-leveling process can include policies for triggering operation based on random or fixed times. In other embodiments, the wear-leveling process can utilize a channel quality monitor (e.g., observed and remedied residual bit error rate (RBER) on a channel or die) as factor in determining when to trigger a data migration. The wear-leveling process can also utilize a trigger based on a limit of how much time a particular chunk can exist in the unusable address space state. The wear-leveling remapper 113 can be separated from policy and trigger management. A policy driver component can be included in the wear-leveling remapper 113 or be a separate component. The policy driver can be utilized or configured to tailor the particular dimension of 'wear' that must be leveled. The wear can be measured by any metric or criteria and any type of policy can be used to minimize wear by the selection, timing and handling of source chunks and destination chunks.

As mentioned herein above, the wear-leveling remapper 113 can also manage power loss to avoid data corruption. The wear-leveling remapper 113 can persist the exchange pointer. The wear-leveling remapper 113 can either be persisted at power loss during hold up or at the time the data migration commences. Following power on and reconstruction of the current and desired virtualization tables, phase bit rebuild, and cursor re-establishment, the wear-leveling remapper 113 can continue any interrupted data migration at the last cursor location. In some embodiments, the wear-leveling remapper can derive the exchange pointer by reconciling the table sets persisted (i.e., by comparison of the recovered current and desired virtualization tables).

Figure 5:
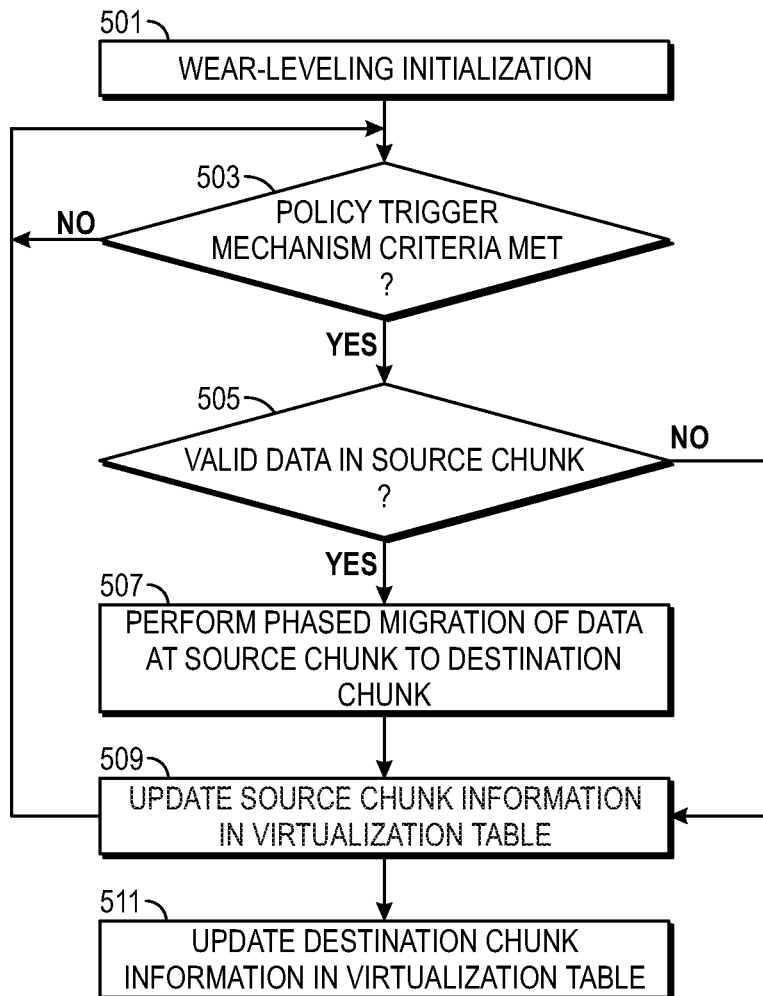
FIG. 5 is a flow diagram of an example wear-leveling process.

FIG. 5 is a flow diagram of one embodiment incorporating triggering policies and phase driven migration. The flow diagram illustrates one embodiment of the wear-leveling process. The wear-leveling process can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible. In the embodiment, the wear-leveling process is initialized at system start or at a similar event (Block 501). The initialization can include determining policies, setting exchange pointers, establishing the virtualization table and similar actions to set up the wear-leveling process. The wear-leveling process can check continuously to determine whether the policy trigger mechanism criteria are met (Block 503). The policy trigger mechanism can define any set of criteria. The policy trigger mechanism defines the criteria that cause the wear-leveling process to update the mapping of logical address space to the physical address space to rotate the spare chunks from unusable address space into the usable address space. If the policy trigger mechanism criteria are not met, then the wear-leveling process can continue to check for changes in conditions in the memory subsystem 110. Examples of policies include periodic activation, completion of related functions (e.g., scrubber assessment functions), detection of elevated error correction in the memory system 110, threshold write levels, weighted joint read and write thresholds, random or fixed timings, and similar criteria or combinations thereof.

When the policy trigger mechanism criteria are met, then the process determines a source chunk that is to be replaced in the usable address space (e.g., a chunk identified by the exchange pointer). The wear-leveling process checks whether there is valid data in the source chunk (Block 505). If there is no valid data in the source chunk, then the wear-leveling process can update the current virtualization table to indicate a next source chunk (Block 509). For example, the wear-leveling process can increment, decrement, or similarly modify the exchange pointer to identify a next source chunk to be utilized. Similarly, the wear-leveling process can update the physical address space information for a logical address space entry of the source chunk to be the physical address space information of the destination chunk. The wear-leveling process can update the physical address space information for a logical address space entry of the destination chunk to be the physical address space information of the source chunk (Block 511).

In a case where there is valid data in the source chunk, then the wear-leveling process performs a phase driven migration of the valid data in the source chunk to the destination chunk (Block 507). The phase driven migration can include the generation of a copy of the current virtualization table and generation of the desired virtualization table, the copying of the valid data to the destination chunk, and the update of the current virtualization table to match the desired virtualization table as each chunk is copied. The update of the source chunk information (Block 509) and destination chunk information (Block 511) in the original virtualization table from which the copy of the current virtualization table and desired virtualization table are derived can be integrated into the phase driven migration or can be separate steps. The wear-leveling process then continues by checking whether the policy trigger mechanism criteria are met (Block 503) in a continuous iterative process that rotates chunks into the unusable address space to distribute wear of all of the chunks in the memory subsystem 110.

The general embodiments and example variant have been described herein above. Further variants are described herein below to further illustrate the wear-leveling process and wear-leveling remapper 113 operation. The first variant described herein above has a die level of granularity and a single spare die in an unusable address space of the memory subsystem 110. The wear-leveling process of the first variant rotates each die in the memory subsystem 110 through the unusable address space (i.e., making each die a spare die for at least one iteration of the process). Other embodiments exist, each with different costs and benefits. The further example embodiments are provided by way of illustration and example and not of limitation, the additional embodiments are not an exhaustive list of possible embodiments that are consistent with the principles and structures described herein.

Figure 6:
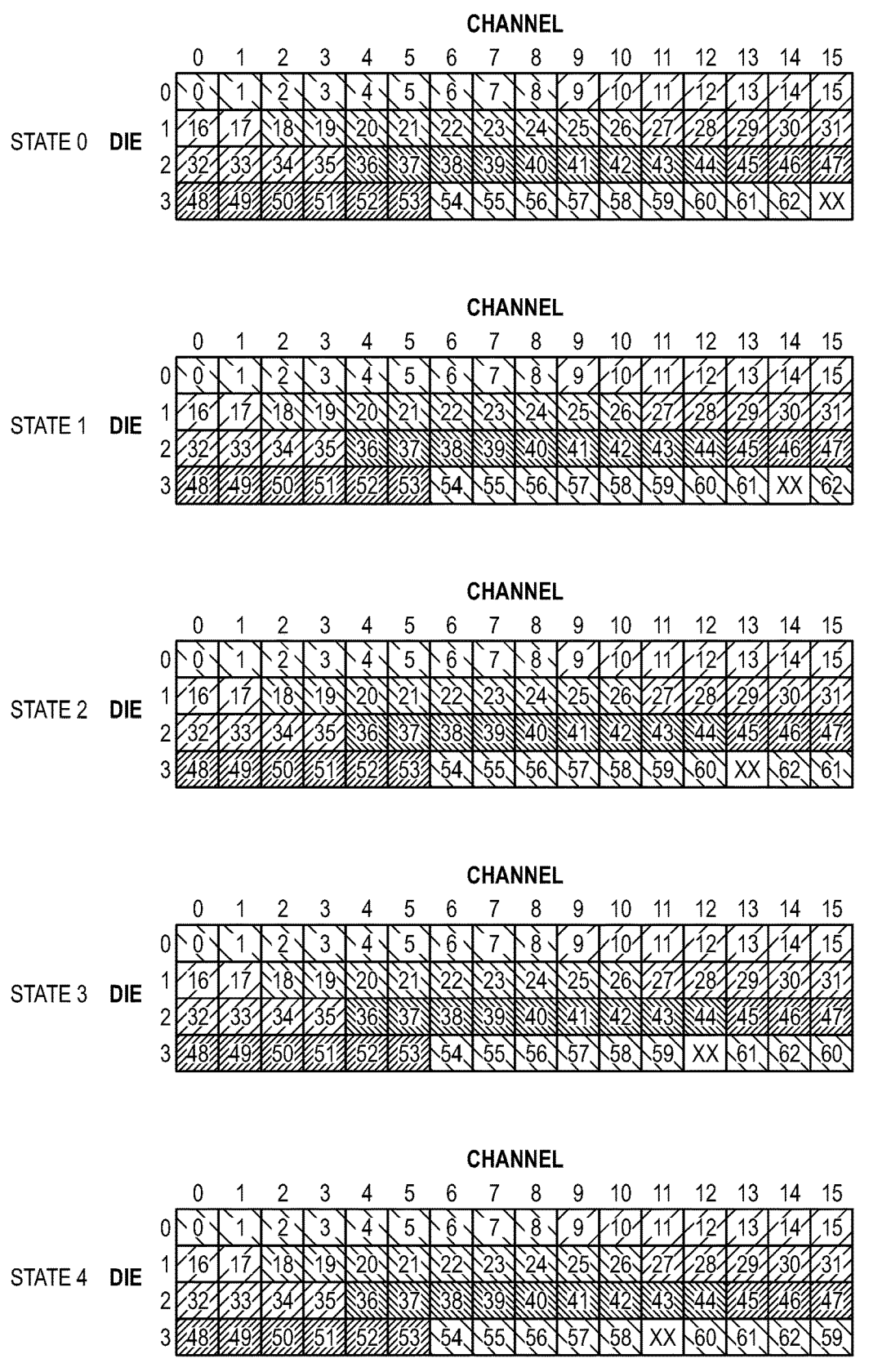

In one embodiment, the wear-leveling process utilizes deep and/or wide channel rotation. One of the inherent characteristics of the example variant described herein above is that spare die rotation process rotates a spare die across channels first then deep on the channels. FIG. 6 is a diagram that illustrates a die address matrix over a set of changes in state. The illustrated set of changes to the die address matrix captures the first four rotations through a 16 channel by 4 die/channel topology for a set of memory components 112A to 112N. In FIG. 6, shaded bands are overlaid onto the matrix, each representing a redundant array of independent disks (RAID) style stripe across nine dice (representing an 8:1 scheme). The die designated XX is a spare die in the unusable address space of the memory subsystem. The rotation scheme of this embodiment of the wear-leveling process rotates a single die per channel in the stripe, meaning that this embodiment of the wear-leveling process will afford channel-level redundancy through indefinite rotations.

Figure 7:
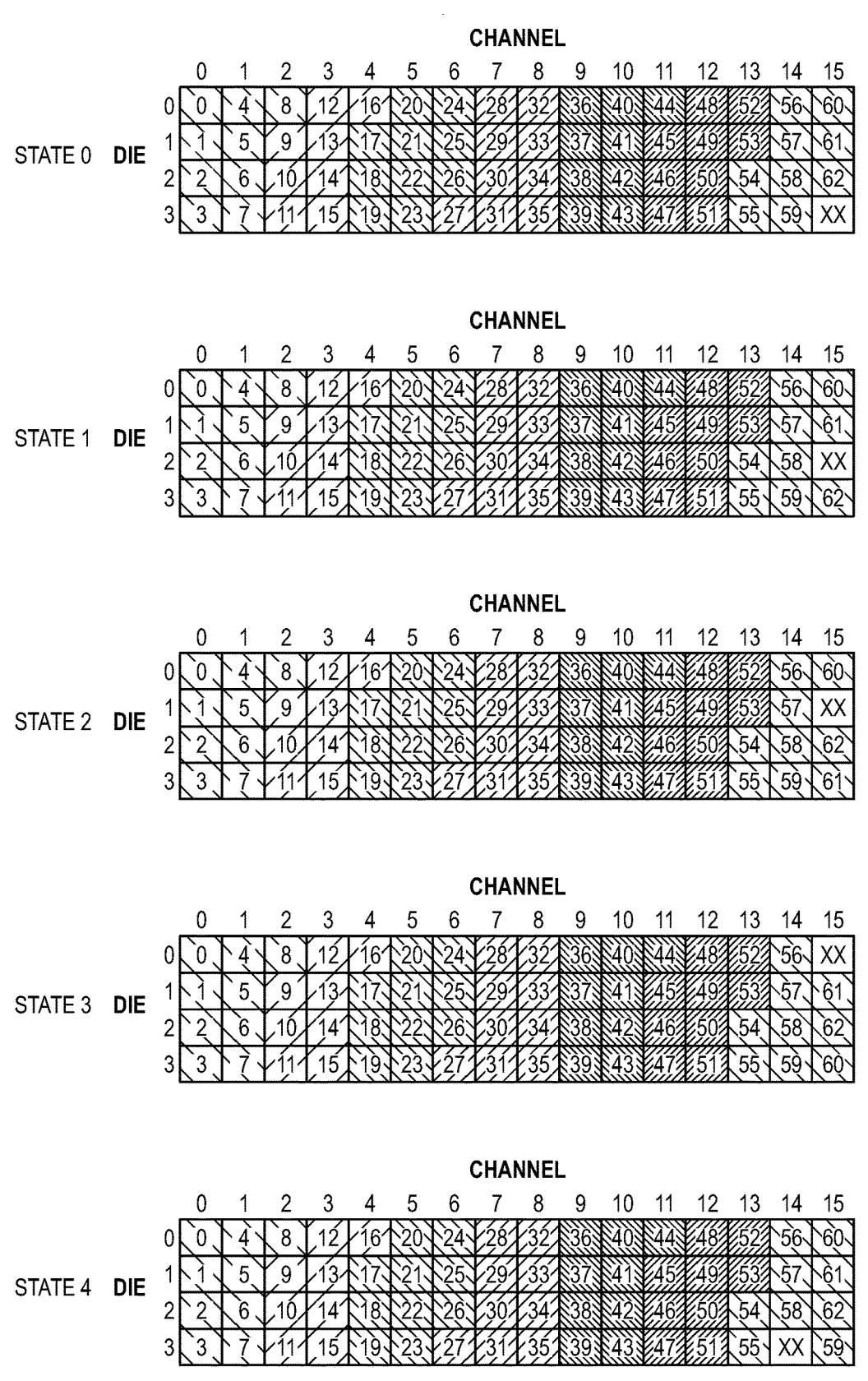

In contrast, FIG. 7 is a diagram that illustrates a die address matrix over a set of state changes. In the illustrated scenario a RAID style stripe orientation is biased towards co-locating RAID style stripe members on a single channel. In this orientation, the wear-leveling process implements a direction of rotation of spare chunks that is deep on the channel first, then wide on channels, following the RAID style stripe orientation. If the converse rotation direction were chosen (wide then deep), the wear-leveling process rotations would eventually produce sufficient skew to spread the RAID stripes across channels rather than deep on channels. In further embodiments, the wear-leveling process can restructure the initialization of the logical address to physical address mappings in the die virtualization table such that the exchange pointer rotation will naturally follow the deep-on-channel-first-then-wide-on-channels direction.

The wear-leveling process is amenable to a variety of different rotation strategies which can be implemented with an appropriate logical address to physical address mapping in the virtualization table.

As mentioned herein above, the wear-leveling process can be adapted to utilize multiple spare chunks in the unusable address space of the memory subsystem 110. In one embodiment, the wear-leveling strategy process uses multiple physical spare chunks and performs "bulk" data migrations per exchange pointer update. This embodiment of the wear-leveling process effectively results in N new chunk associations per pass through a data migration. N in this embodiment is referred to as the "stride." While still adhering to the general model of deterministic, algorithmic rotations with phase-driven remaps on an individual mapped chunk to spare chunk basis, this wear-leveling embodiment affords a variety of additional capabilities and beneficial attributes.

The embodiments of the wear-leveling process that utilize multiple spare chunks can be categorized into two approaches, one category of multiple chunk wear-leveling is referred to as "deep stripe rotation" and the other multiple chunk wear-leveling is referred to as "wide stripe rotation." Deep stripe rotation defines the stride to be the number of chunks (e.g., a number of dice) on a particular channel, hence the term "deep" as in "deep on the channel." The group of N chunks in the stride logically rotate together. For example, in a 15 channel by 4 dice/channel topology, N would be 4. In the initialization of the virtualization table for this embodiment, the wear-leveling process can provision all chunks (e.g., dice) on a given channel as spare chunks.

Figure 8:
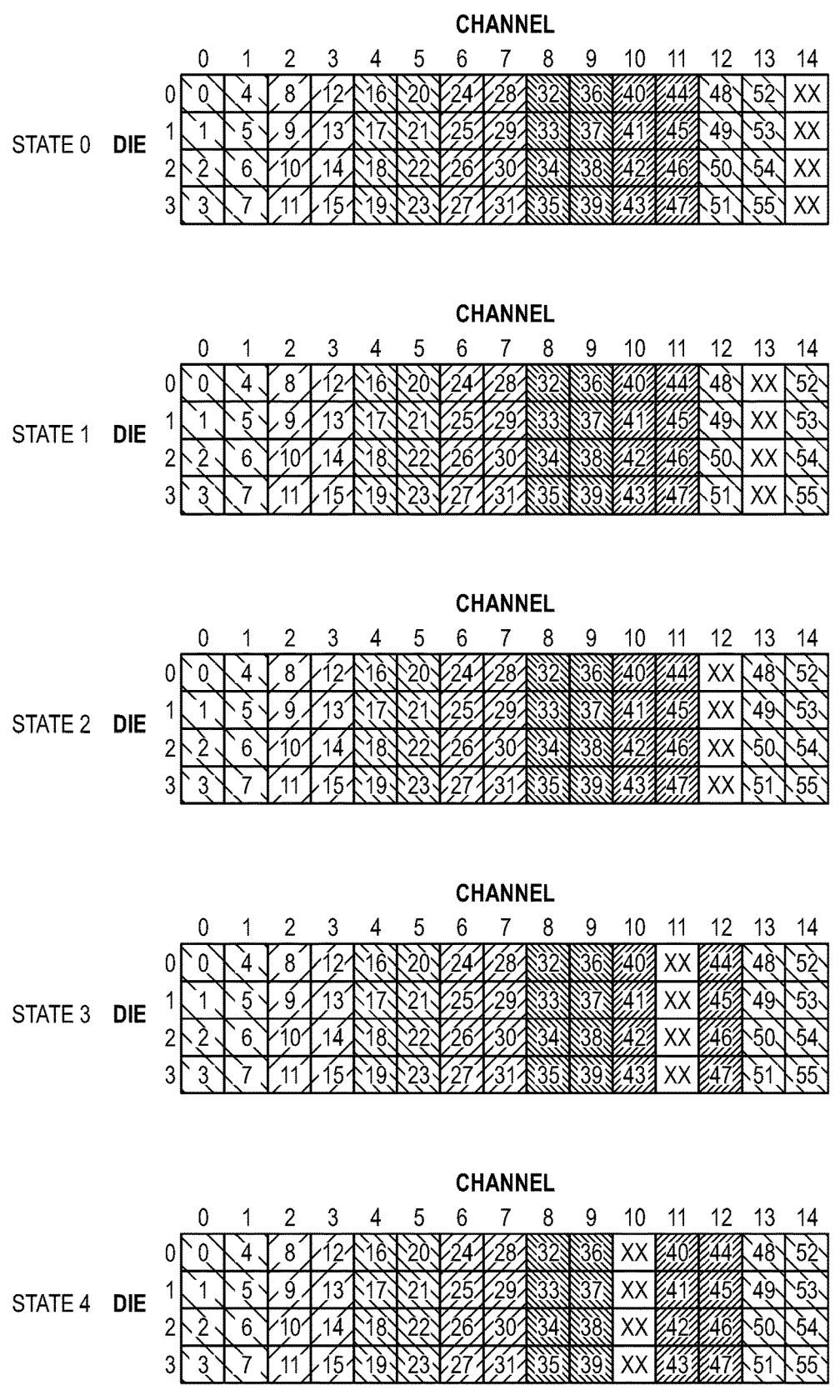

FIG. 8 is a diagram that illustrates an example die matrix representation of the virtualization tables of the wear-leveling process. The example shows the state of the virtualization table over the first four transitions following initialization. In this example, the shaded bands in the representation are logical groupings that manifest as address ranges in the usable address space exposed to a host system 120.

In this embodiment, the wear-leveling remapper relocates one entire stride to a new channel on each data migration, the stride itself stays intact on the particular channel to which it is assigned. This characteristic can have an important benefit in certain controller embodiments. In one embodiment, this wear-leveling scheme can be utilized with an error correcting code (ECC) architecture. In this embodiment, a codeword is striped across portions of the N=4 dice on a single channel. If the ECC encoder/decoder is coupled to a particular channel in the sense that a codeword must be entirely constructed from data stored on dice on that particular channel, a data migration cannot break up the codewords associated with (or striped across) the dice in that group by data migration of only a portion of the group. Thus, a rotation scheme must migrate the group as an indivisible unit for this example ECC architecture.

In this example embodiment, the wear-leveling process updates the exchange pointer along with the virtualization table state transitions as with other embodiments. However, the wear-leveling process decrements or increments the exchange pointer by the size of the stride for each data migration, rather than decrementing or incrementing the exchange pointer by 1 as in the other embodiments with singe spare chunks. As with the other embodiments, the exchange pointer wraps such that it only iterates through the usable address portion of the address space of the memory subsystem 110.

In this embodiment, the wear-leveling process implements a data migration sequence to move a full stride's worth of data, which is more complex than the data migration sequence to move a single chunk's worth of data. Instead of a single read-rewrite per chunk that needs to be moved from a current to desired virtualization table state, the wear-leveling process performs N read-rewrites, each read-write moving a single chunk from current virtualization table to desired virtualization table state. If the wear-leveling remapper 113 capabilities support it, a single, shared cursor can describe data migration progress through the address space memory subsystem 110. The shared cursor capability would support atomic and power loss safe read-rewrites for the N members of the stride such that a single cursor could describe a unified and unequivocally correct offset. If the wear-leveling remapper 113 does not support this capability, each member chunk of the stride would need an independent cursor, increasing the power loss hold up requirement such that N (instead of 1) cursors were persisted on power loss.

Figure 9:
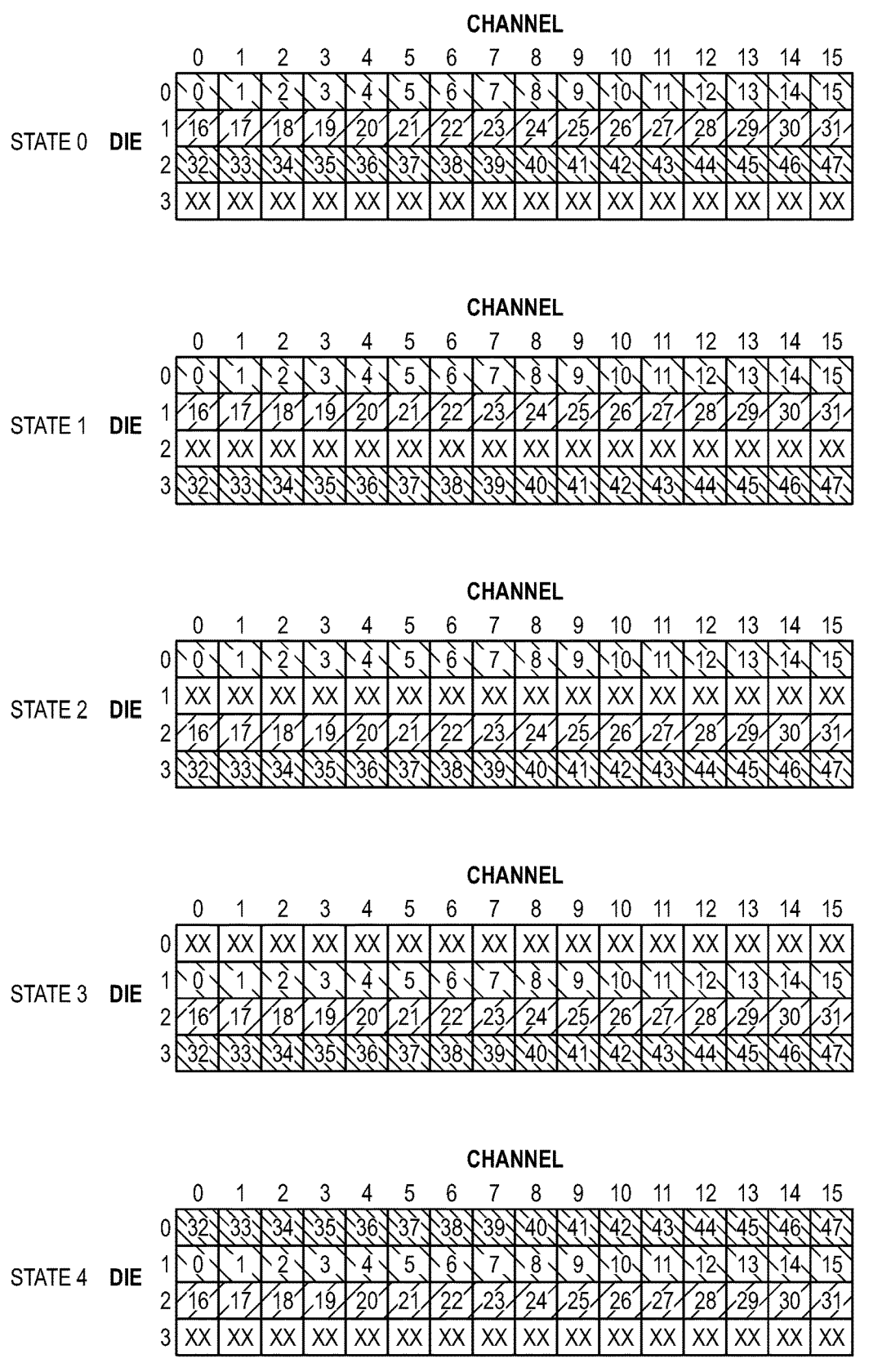

FIG. 9 is a diagram of a matrix representation of a virtualization table for a wide stripe rotation embodiment. A wide stripe rotation defines a stride that is orthogonal to that defined for deep stripe rotation, e.g., rather than defining N to be the number of chunks (e.g., dice) on a channel, N is defined to be the number of channels in the topology. As with deep stripe rotation, this group of N chunks in the stride logically rotate together, moving to a different shared offset on every channel with each iteration. In an example with 16 channel by 4 dice/channel topology, N would be 16. A virtualization table can be initialized for this embodiment such that all chunks residing at a given channel offset on all channels are provisioned as spare chunks. This is referred to as the "wide stripe."

FIG. 9 illustrates four states of the virtualization table for this embodiment. In this example, the colored bands in that representation are logical groupings that manifest as address ranges in the address space exposed to a user. The successive states illustrate that while one entire stride gets relocated to a new offset on each migration, the stride itself stays intact at a particular offset. This kind of orientation aligns with logical unit layouts that stripe a larger granularity unit such as an ECC codeword across the channels. With PCM media, for example, a controller and ECC implementation may use a 48-page codeword, placing 3 pages of that codeword on one or more partitions of each of the 16 dice in the stripe. Such an implementation may provide a minimized access latency in situations where channel contention can be eliminated at the cost of an ECC implementation where the encoder/decoder is a shared among channels. In this wide stripe embodiment, the wear-leveling process decrements or increments the exchange pointer by the stride size for each data migration. As with the previously embodiments, the exchange pointer wraps such that it only iterates through the usable portion of the address space of the memory subsystem 110.

The data migration sequence for this embodiment moves a full stride's worth of data and is more complex than a data migration sequence to move a single chunk of data. Instead of a single read-rewrite per chunk that needs to be moved from current to desired virtualization table state, the wear-leveling process implements N read-rewrites, each read-write moving either a single chunk, or component of a codeword or chunk, from current virtualization table to desired virtualization table state. In some embodiments, the wear-leveling remapper 113 can support a single, shared cursor that can track migration progress through the address space.

The following embodiments relate to another example application of the wear-leveling scheme referred to as a hierarchical remapping scheme. The prior example embodiments described an algorithmic remapping scheme based on die granularity chunks. The die granularity is subjectively considered rather coarse, assuming a die has sufficient capacity to hold thousands or more write units. If die level remapping is exclusively implemented, it may not distribute wear for intra-die hotspots. Thus, the further example embodiments provide a finer-grained algorithmic indirection schemed applied intra-die. These embodiments can be implemented by a wear-leveling remapper 113 in combination with larger granularity wear-leveling processes. For example, if both the die wear-leveling and intra-die wear-leveling schemes are layered onto a non-volatile memory storage topology and virtualized addressing, the wear-leveling evenness of the memory components 112A to 112N can be dramatically improved. Layered wear-leveling processes can result in more-perfect wear distribution under even the most heavily skewed host system 120 access patterns. For sake of clarity and conciseness, however, the finer granularity wear-leveling examples are provided separate from a layered wear-leveling embodiment.

As used herein, a 'segment' refers to an intra-die block, for example a 64 k logical block entity. The segment can be any size and include any number of blocks. In one example embodiment, the memory components 112A to 112N include segments with a physical segment size (64 k, with 4 k blocks) plus an additional spare block. Thus, the segment has a 64 k+1, 4 k block footprint, excluding any media overhead for ECC, cyclic redundancy check (CRC), spare bits, or other per-block bits.

Each segment has a base physical address that associates it to a range of sequential physical addresses. For example, the memory components 112A to 112N can provide a 32-bit physical address space in 4 k blocks. The base address is static for the life of the segment. Each segment can be associated with two variables. The first variable is called the Rotation Count (RC) and the second variable is called the exchange pointer (EP). Both variables are used to define the indirection between the logical and physical layout of blocks in the segment. The RC field is sized based on the endurance capabilities of the media of the memory components 112A to 112N. The RC field acts as a proxy for the degree of wear experienced by the segment, as each rotation is correlated with an amount of wear for a segment. The EP is a value that is able to index the full physical range of the segment. In this example, the physical range would be (64 k+1) blocks, necessitating 17 bits to capture the index scope.

In some embodiments, a threshold value can be associated with each segment. This threshold value can then be considered to be part of the "segment metadata" along with the RC and EP, or it can be defined globally for all segments. Virtualization tables are not necessary for this wear-leveling embodiment. The two variables (RC and EP) supplant the virtualization table function of the coarser grain embodiments.

In an example to illustrate the topology-segment relationship, a storage device supports a flat physical address space of 1 tebibyte (TiB) (1,099,511,627,776 Bytes) arranged in 4 k physical blocks. There are 268,435,456 blocks in this example storage device. In the example, the blocks are arranged into segments of (64 k+1) size, thus, there are 4095 segments, which minimally requires 12 bits to index in table form.

In the intra-segment embodiments, a virtualization table is not utilized for mapping logical address spaces to physical address spaces. Instead, this example wear-leveling process utilizes a different mechanism for achieving indirection. The finer granularity wear-leveling process utilizes RC, EP, and a translation function to achieve the logical to physical indirection.

The EP references a spare (in the sense that no logical address maps to it) physical location in the segment. The RC tracks how many times the spare physical location has migrated through every possible physical location in the segment. The forward translation function to convert a logical address (LA) to a physical address (PA) for a segment with N=64 k logical blocks is:

```
PA = (LA + RC) modulus N
If (PA >= EP)
    PA = PA + 1
```

Figure 10:
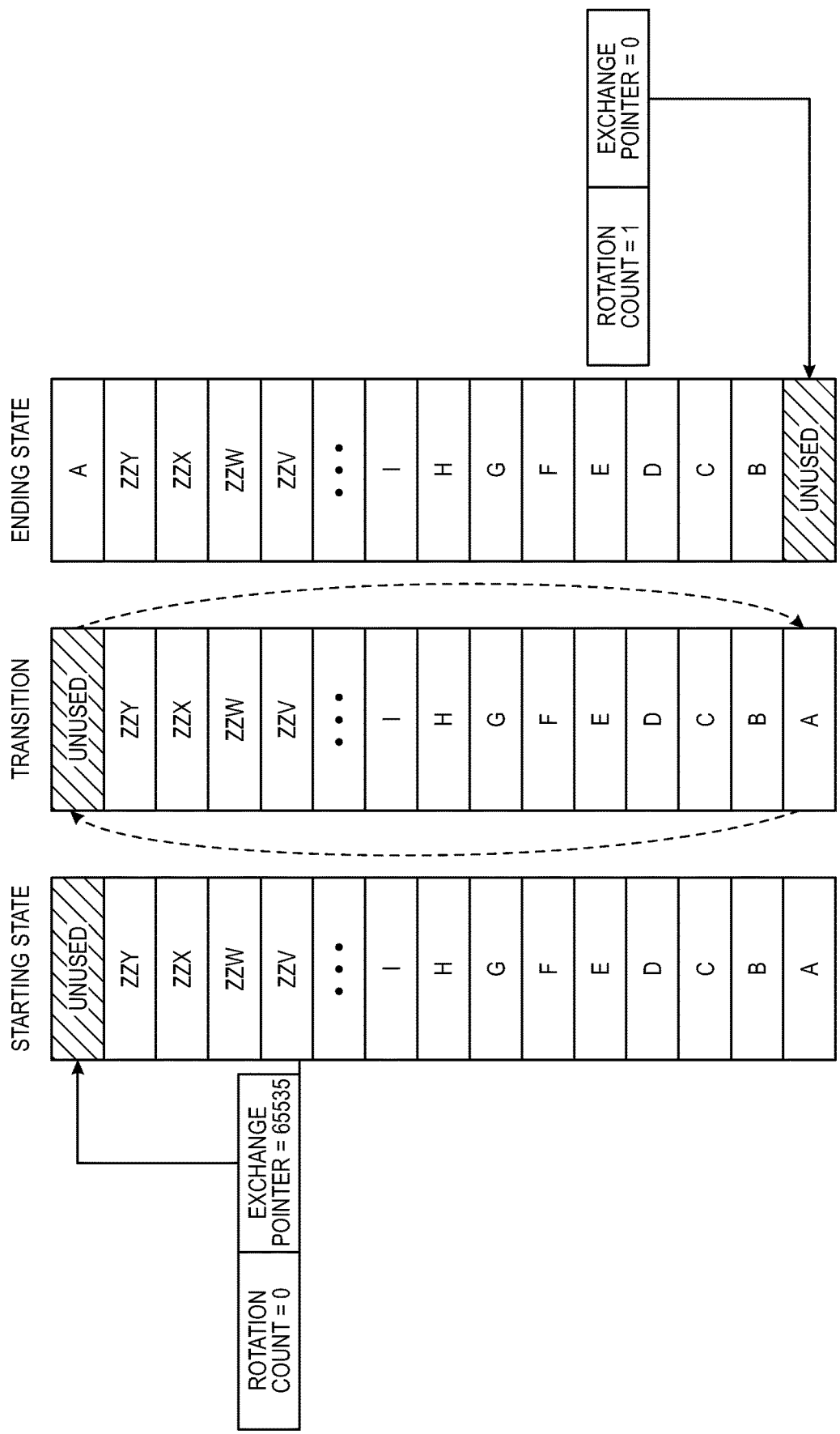
FIG. 10 is a diagram of an example wrap around wear-leveling process.

FIG. 10 is a diagram of one embodiment of the intra-segment wear-leveling process. Wear-leveling with a segment is effected by deterministic, sequential rotation of the logical to physical association. The EP, RC, and a trigger are inputs to an algorithm that implements the indirection, as shown:

```
if (triggered)
    Copy Data from [(EP + 1) modulus (N + 1)] to [EP]
    EP = (EP + 1) modulus (N + 1)
    if (EP == 0)
        RC = RC + 1
```

FIG. 10 shows a data migration from a starting state to an ending state. The exchange pointer identifies a first block in the segment. When the data migration is triggered, the data at a source chunk, i.e., a source block that is a prior increment of the EP is copied into the destination chunk, i.e. a destination block identified by the EP. In the case, which is illustrated, that the EP is at the end of a segment, then a modulus operation with the size of the segment can be used to identify the source block at the other end of the segment. In addition, the RC in incremented in each case that a wrap occurs. The RC is used to enable a translation of a logical location with a physical location, where the RC and EP can be combined to enable the translation function to determine an exact initial state of the segment and any state between the initial state and the current state.

A policy-based trigger mechanism can be used to determine when a rotation of the wear-leveling process can be implemented in a manner analogous to the policy-based trigger mechanisms of coarser granularity wear-leveling processes. An example trigger can be a function of any number of inputs, including writes and/or reads to the segment, writes and/or reads to cells adjacent to cells in the segment, spatial locality of block accesses within the segment, available but unused read/write bandwidth, periodic triggering, and random time delta triggering. The policy trigger mechanism utilized with a wear-leveling process to trigger a data migration, therefore, can be implementation specific. In many example embodiments, a heavy memory subsystem 110 technology and memory component 112A to 112N medium based dependency can indicate the appropriate trigger mechanism criteria.

The variables used by the wear-leveling process to support algorithmic rotation of the intra-segment blocks can additionally serve as relative wear metrics. The on-media size of a segment is its logical size+1. In these embodiments, the segment is defined to be 64 k blocks. Each time the RC variable increments, 64 k+1 data migrations, each requiring a block read and write, have occurred in the segment. If the objective of the method is to wear-level writes, as is the common case, the RC multiplied by the trigger threshold represents an aggregate write count across the segment. If all segments have the same trigger threshold, the RC acts as a proxy for wear and can be contrasted directly. Segments with outlier RCs are good candidates for a higher-level wear-leveling or retirement in a multi-layered wear-leveling process. In some embodiments, the wear-leveling process can utilize random and non-deterministic source block selection methods. These embodiments may introduce enough variation among the accesses to the blocks to preclude the use of the RC as a precise wear estimate.

If the embodiments of the fine granularity wear-leveling are implemented in an SSD or other managed media solution, the embodiments can also incorporate power loss handling mechanisms. The power loss handling mechanisms can include capturing RC and EP values for all segments at power loss time for re-instantiation on power re-application, scanning media on power re-application to derive the RC and EP values, and hybrid approaches where the RC and EP variables for all segments are persisted periodically rather than at power loss. The last persisted values may not be precise at power re-application, requiring an abbreviated scan to regenerate the variables.

Figure 11:
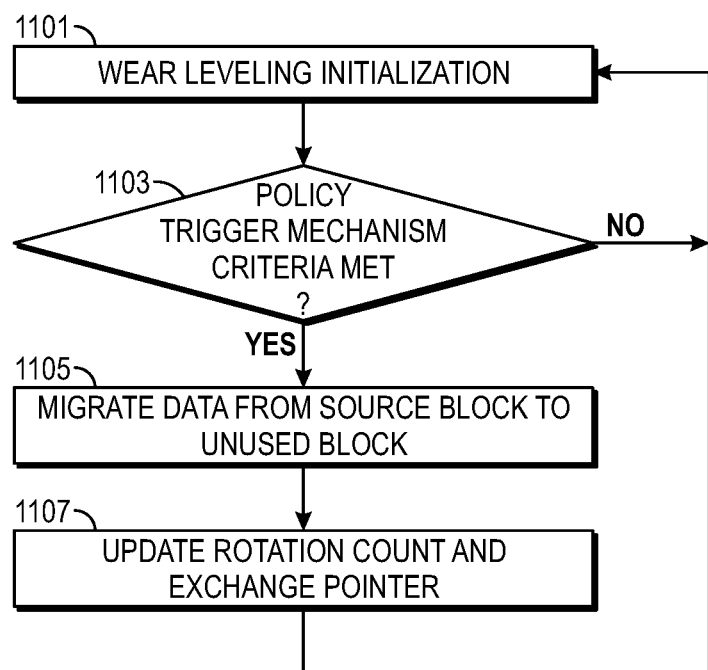
FIG. 11 is a flow diagram of an example wear-leveling process.

FIG. 11 is a flow diagram of a fine granularity wear-leveling process. The fine-granularity wear-leveling process can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible. The fine granularity wear-leveling process can initialize RC and EP values for each segment to be managed (1101). The fine granularity wear-leveling process can implement any policy triggering mechanism to control when data migrations are performed for the wear-leveling (Block 1103). Any policy triggering mechanism based on any input criteria can be utilized. The wear-leveling process waits to perform a data migration until the policy trigger criteria are met. Policy trigger criteria can include threshold write counts to a segment, periodic activation, threshold write levels, weighted joint read and write thresholds, random or fixed timings, and similar criteria or combinations thereof.

Once triggered, the data at a source block is copied to a destination block that is an unused block (Block 1105). After the data migration has completed, then the EP and RC are incremented to a next location for a source block taking into consideration a wraparound scenario that triggers the adjustment of the RC and applies a modulo operation to the adjustment of the EP (Block 1107). The process then continuously checks for additional events that meet the policy trigger policy mechanism criteria.

Figure 12:
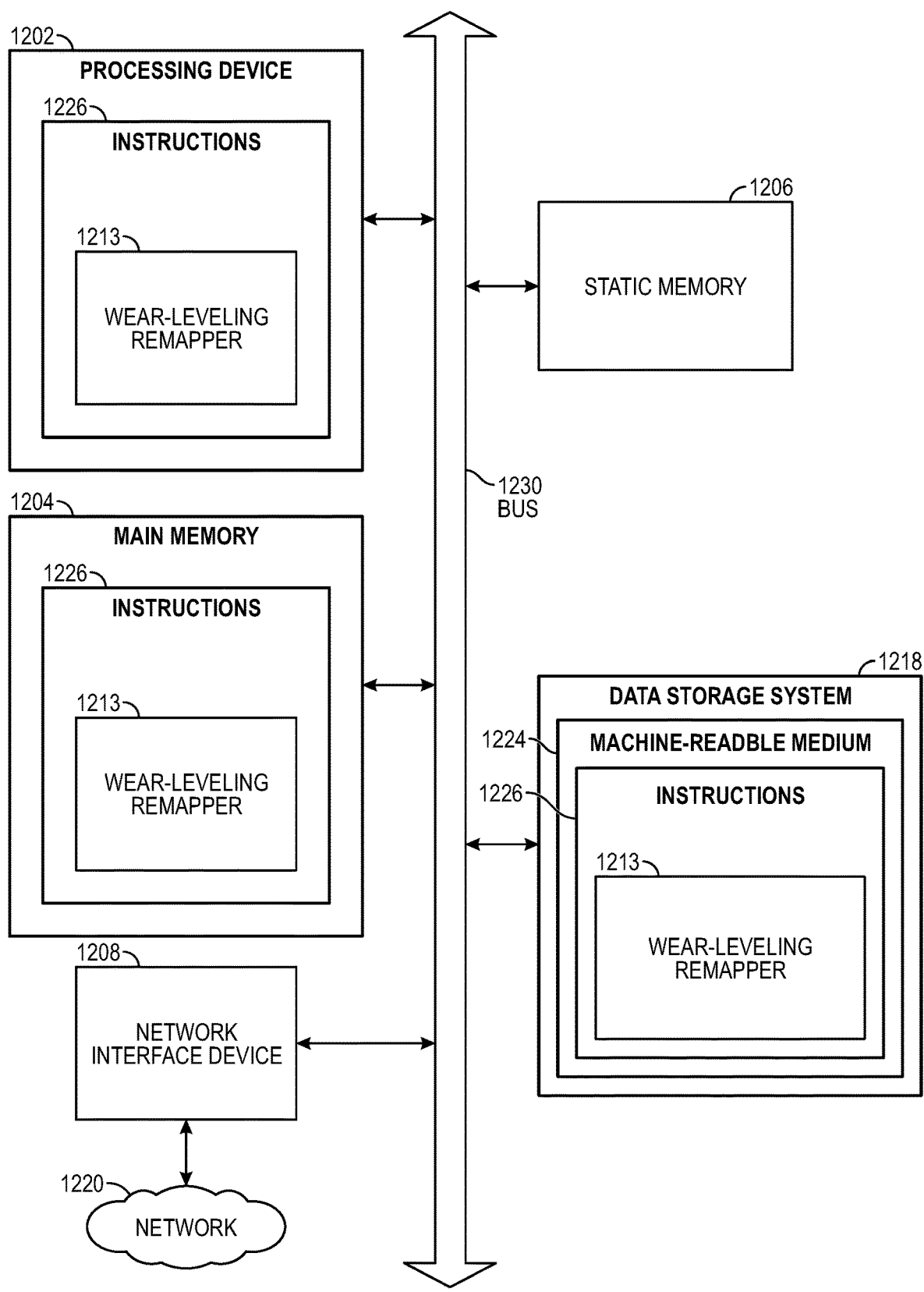
FIG. 12 is a block diagram of an example computer system in which embodiments of the present disclosure may operate.

FIG. 12 illustrates an example machine of a computer system 1200 within which a set of instructions, for causing the machine to perform any one or more of the methodologies discussed herein, can be executed. In some embodiments, the computer system 1200 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the wear-leveling remapper 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1200 includes a processing device 1202, a main memory 1204 (e.g., read-only memory (ROM), flash memory, dynamic random access memory (DRAM) such as synchronous DRAM (SDRAM) or Rambus DRAM (RDRAM), etc.), a static memory 1206 (e.g., flash memory, static random access memory (SRAM), etc.), and a data storage system 1218, which communicate with each other via a bus 1230.

Processing device 1202 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1202 can also be one or more special-purpose processing devices such as an application specific integrated circuit (ASIC), a field programmable gate array (FPGA), a digital signal processor (DSP), network processor, or the like. The processing device 1202 is configured to execute instructions 1226 for performing the operations and steps discussed herein. The computer system 1200 can further include a network interface device 1208 to communicate over the network 1220.

The data storage system 1218 can include a machine-readable storage medium 1224 (also known as a computer-readable medium) on which is stored one or more sets of instructions 1226 or software embodying any one or more of the methodologies or functions described herein. The instructions 1226 can also reside, completely or at least partially, within the main memory 1204 and/or within the processing device 1202 during execution thereof by the computer system 1200, the main memory 1204 and the processing device 1202 also constituting machine-readable storage media. The machine-readable storage medium 1224, data storage system 1218, and/or main memory 1204 can correspond to the memory subsystem 110 of FIG. 1.

In one embodiment, the instructions 1226 include instructions to implement functionality corresponding to a wear-leveling remapper (e.g., the wear-leveling remapper 113 of FIG. 1). While the machine-readable storage medium 1224 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, may carry out the computer-implemented method of the wear-leveling process in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
    selecting a source chunk to be removed from a usable address space of a memory subsystem to distribute wear across all available chunks in the memory subsystem, the memory subsystem having a plurality of non-volatile memory components, the plurality of non-volatile memory components including a plurality of chunks including at least one chunk in an unusable address space of the memory subsystem;
    copying valid data of the source chunk to a destination chunk in the unusable address space of the memory subsystem, the copying including a phase driven migration that tracks a pre-migration phase and a post-migration phase for the source chunk and the destination chunk; and
    updating a virtualization table to track assignment of the destination chunk to a location in the usable address space of the memory subsystem occupied by the source chunk.

2. The method of claim 1, wherein selecting the source chunk includes identifying the source chunk using a rotation count and exchange pointer.

3. The method of claim 1, further comprising:
    assigning the source chunk to the unusable address space of the memory subsystem.

4. The method of claim 1, further comprising:
    determining whether policy criteria are met to trigger copying the valid data to the destination chunk.

5. The method of claim 1, wherein copying valid data further comprising:
    performing the phase driven migration of the valid data to the destination chunk, the phase driven migration updating a pre-migration table with a phase bit per mapping and a post-migration table with a phase bit per mapping to track state of the migration.

6. The method of claim 1, wherein selecting the chunk includes selecting a stripe of chunks to be migrated simultaneously.

7. The method of claim 1, wherein updating the virtualization table to track assignment of the destination chunk includes updating the virtualization table to map a logical location of the destination chunks to a physical location for the destination chunk in the memory subsystem.

8. A memory subsystem implementing a process for wear-leveling, the memory subsystem comprising:
a plurality of non-volatile memory components, the plurality of non-volatile memory components defining a plurality of chunks including at least one chunk in an unusable address space of the memory subsystem; and
a processor coupled to the plurality of non-volatile memory components, the processor to migrate valid data of a first chunk in a usable address space of the memory subsystem to a second chunk in the unusable address space of the memory subsystem to wear-level the plurality of non-volatile memory components, to update mapping information to enable indirect addressing of the data in the second chunk in the usable address space of the memory subsystem, and to update phase information to track each stage of a phase driven migration including a pre-migration phase and a post-migration phase for the first chunk and the second chunk.

9. The memory subsystem of claim 8, wherein the processor is further to change a logical address mapping for the valid data from the first chunk to the second chunk.

10. The memory subsystem of claim 8, wherein the processor is further to determine whether policy criteria are met to trigger migrating the valid data to the second chunk.

11. The memory subsystem of claim 8, wherein the processor is further to implement migration of the valid data to the second chunk as the phase driven migration, the phase driven migration to update a pre-migration table with a phase bit per mapping and a post-migration table with a phase bit per mapping to track state of the migration.

12. The memory subsystem of claim 8, wherein the processor is further to select a stripe of chunks including the first chunk to be migrated simultaneously.

13. The memory subsystem of claim 8, wherein the processor is further to select a first chunk by using a rotation count and exchange pointer.

14. The memory subsystem of claim 8, wherein the processor is further to update a virtualization table to map a logical location to a physical location for the data in the second chunk.

15. A non-transitory computer-readable storage medium comprising instructions that, when executed by a processing device, cause the processing device to:
move valid data of a source chunk in a usable address space of a memory subsystem to a destination chunk in unusable address space of the memory subsystem, distribute wear in the memory subsystem;
track mapping data to enable physical address determination for the valid data in the destination chunk; and
update phase information to track each stage of a phase driven migration including a pre-migration phase and a post-migration phase for the source chunk and the destination chunk.

16. The non-transitory computer-readable storage medium of claim 15, the processing device further to:
updating mapping data of the source chunk to indicate a location in the unusable address space of the memory subsystem.

17. The non-transitory computer-readable storage medium of claim 15, the processing device further to:
determine whether policy criteria are met to trigger moving the valid data to the destination chunk.

18. The non-transitory computer-readable storage medium of claim 15, the processing device further to:
update a pre-migration table with a phase bit per mapping data entry and a post-migration table with a phase bit per mapping data entry to track a state of the move of the valid data from the source chunk to the destination chunk.

19. The non-transitory computer-readable storage medium of claim 15, moving the valid data of the source chunk is part of a simultaneous move of a stripe of source chunks to a strip of destination chunks in the memory subsystem.

20. The non-transitory computer-readable storage medium of claim 15, the processing device further to:
update the mapping data by updating a rotation count and exchange pointer.

* * * * *